(12) United States Patent
Meushar et al.

(10) Patent No.: US 10,510,050 B2
(45) Date of Patent: Dec. 17, 2019

(54) MEETINGS AND EVENTS COORDINATING SYSTEM AND METHOD

(71) Applicant: Private Secretary Ltd., Tel Aviv (IL)

(72) Inventors: Dana Meushar, Tel Aviv (IL); Sharon Meushar, Tel Aviv (IL)

(73) Assignee: Private Secretary, Ltd., Tel Aviv (IL)

( * ) Notice: Subject to any disclaimer, the term of this patent is extended or adjusted under 35 U.S.C. 154(b) by 713 days.

(21) Appl. No.: 15/166,689

(22) Filed: May 27, 2016

(65) Prior Publication Data

US 2016/0275458 A1 Sep. 22, 2016

Related U.S. Application Data

(63) Continuation-in-part of application No. 14/010,897, filed on Aug. 27, 2013, now abandoned.

(30) Foreign Application Priority Data

Sep. 10, 2012 (IL) .......................... 221868

(51) Int. Cl.
    *G06Q 10/00* (2012.01)
    *G06Q 10/10* (2012.01)
(52) U.S. Cl.
    CPC ....... *G06Q 10/1095* (2013.01); *G06Q 10/109* (2013.01)
(58) Field of Classification Search
    None
    See application file for complete search history.

(56) References Cited

U.S. PATENT DOCUMENTS 5,960,406 A    9/1999   Rasansky et al.
7,313,530 B2  12/2007   Smith et al.
(Continued)

FOREIGN PATENT DOCUMENTS

CN    102413231 A      4/2012
RU      2435208 C2    11/2011
WO   1999038079        7/1999

OTHER PUBLICATIONS

Understanding Meeting Updates, Jun. 11, 2012, Technet blog, p. 1-4.*

(Continued)

*Primary Examiner* — Joseph M Waesco
(74) *Attorney, Agent, or Firm* — Blank Rome LLP

(57) ABSTRACT

Providing dynamic scheduling services without sharing calendar content, involving retrieving real time availability data and terms applied to calendar time cubes for an invitation to an event with one or more invited users, simultaneously synchronizing between calendars of the invited users in a meeting and event coordinating server to find a combination of common available matching time cubes while considering the terms including arrival time calculations (the common available matching time cubes defined as either "free", "occupied", "pending", ane having a lower level of importance than the event currently created), setting the state of the matched time cubes as occupied at the calendar of each invited user; and rescheduling an event that was previously associated with the sequence of "occupied", "pending" states with the lower level of importance, the already existing events being automatically subject to changes constantly and immediately.

21 Claims, 11 Drawing Sheets

(56) References Cited

U.S. PATENT DOCUMENTS

| | | | |
|---|---|---|---|
| 8,832,209 B2 | 9/2014 | Jhanji | |
| 2002/0133545 A1* | 9/2002 | Fano | G06Q 10/10 |
| | | | 709/203 |
| 2003/0149606 A1* | 8/2003 | Cragun | G06Q 10/109 |
| | | | 705/7.19 |
| 2004/0254859 A1 | 12/2004 | Aslanian, Jr. | |
| 2005/0034079 A1* | 2/2005 | Gunasekar | G06F 17/289 |
| | | | 715/753 |
| 2005/0144133 A1 | 6/2005 | Hoffman et al. | |
| 2006/0200374 A1* | 9/2006 | Nelken | G06Q 10/109 |
| | | | 705/7.19 |
| 2007/0198316 A1* | 8/2007 | Boland | G06Q 10/02 |
| | | | 705/5 |
| 2007/0226035 A1 | 9/2007 | Doss et al. | |
| 2007/0276719 A1 | 11/2007 | Franco | |
| 2008/0040184 A1* | 2/2008 | Cragun | G06Q 10/06311 |
| | | | 705/7.19 |
| 2008/0091504 A1* | 4/2008 | Lyle | G06Q 10/063116 |
| | | | 705/7.19 |
| 2008/0104517 A1* | 5/2008 | Horvitz | G06Q 10/10 |
| | | | 715/733 |
| 2008/0134069 A1* | 6/2008 | Horvitz | G06Q 10/10 |
| | | | 715/765 |
| 2008/0140776 A1* | 6/2008 | Horvitz | G06Q 10/10 |
| | | | 709/204 |
| 2008/0228547 A1* | 9/2008 | Doss | G06Q 10/06314 |
| | | | 705/7.19 |
| 2009/0006161 A1* | 1/2009 | Chen | G06Q 10/109 |
| | | | 705/7.19 |
| 2009/0055235 A1* | 2/2009 | Oral | G06Q 10/06314 |
| | | | 705/7.24 |
| 2009/0083106 A1* | 3/2009 | Bhogal | G06Q 10/109 |
| | | | 705/7.19 |
| 2009/0083377 A1 | 3/2009 | Ben-Haim et al. | |
| 2009/0089133 A1* | 4/2009 | Johnson | G06Q 10/109 |
| | | | 705/7.21 |
| 2009/0094088 A1* | 4/2009 | Chen | G06Q 10/06312 |
| | | | 705/7.19 |
| 2009/0112984 A1* | 4/2009 | Anglin | G06Q 10/00 |
| | | | 709/204 |
| 2009/0125365 A1* | 5/2009 | Masselle | G06Q 10/109 |
| | | | 705/7.18 |
| 2009/0210262 A1* | 8/2009 | Rines | G06Q 10/02 |
| | | | 705/5 |
| 2009/0210351 A1* | 8/2009 | Bush | G06Q 10/109 |
| | | | 705/80 |
| 2009/0259718 A1* | 10/2009 | O'Sullivan | G06Q 10/10 |
| | | | 709/204 |
| 2009/0287685 A1* | 11/2009 | Charnock | G06F 16/38 |
| 2009/0292550 A1* | 11/2009 | Ly | G06Q 10/101 |
| | | | 705/300 |
| 2009/0319319 A1* | 12/2009 | Oral | G06Q 10/109 |
| | | | 705/7.18 |
| 2009/0327019 A1* | 12/2009 | Addae | G06Q 10/109 |
| | | | 705/7.18 |
| 2010/0022225 A1* | 1/2010 | Benger | G06Q 10/109 |
| | | | 455/414.1 |
| 2010/0088143 A1* | 4/2010 | Platt | G06Q 10/063116 |
| | | | 705/7.18 |
| 2010/0121666 A1* | 5/2010 | Niazi | G06Q 10/0633 |
| | | | 705/7.27 |
| 2010/0161720 A1 | 6/2010 | Colligan et al. | |
| 2010/0217644 A1* | 8/2010 | Lyle | G06Q 10/063116 |
| | | | 705/7.16 |
| 2011/0054976 A1* | 3/2011 | Adler | G06Q 10/109 |
| | | | 705/7.18 |
| 2011/0099042 A1* | 4/2011 | Yerkes | G06Q 10/06 |
| | | | 705/7.19 |
| 2011/0184768 A1* | 7/2011 | Norton | G06Q 10/02 |
| | | | 705/5 |
| 2011/0184772 A1* | 7/2011 | Norton | G06Q 10/02 |
| | | | 705/7.18 |
| 2011/0184943 A1* | 7/2011 | Norton | G06Q 10/02 |
| | | | 707/723 |
| 2011/0231216 A1 | 9/2011 | Fyke et al. | |
| 2011/0264745 A1* | 10/2011 | Ferlitsch | G06Q 10/109 |
| | | | 709/205 |
| 2011/0276507 A1* | 11/2011 | O'Malley | G06Q 10/00 |
| | | | 705/321 |
| 2011/0320235 A1* | 12/2011 | Bak | G06Q 10/1095 |
| | | | 705/7.19 |
| 2012/0084286 A1 | 4/2012 | Hubner et al. | |
| 2012/0117153 A1* | 5/2012 | Gunasekar | G06F 17/289 |
| | | | 709/204 |
| 2012/0136572 A1* | 5/2012 | Norton | G01C 21/3407 |
| | | | 701/465 |
| 2012/0150580 A1* | 6/2012 | Norton | G01C 21/3407 |
| | | | 705/7.19 |
| 2012/0150581 A1* | 6/2012 | McPhail | G06Q 10/10 |
| | | | 705/7.19 |
| 2012/0278381 A1 | 11/2012 | Ferlitsch et al. | |
| 2012/0296993 A1 | 11/2012 | Heyman et al. | |
| 2014/0067455 A1 | 3/2014 | Zhang et al. | |

OTHER PUBLICATIONS

Using Outlook's Autopick Next and Suggested times, Oct. 23, 2011, Slipstick.com, p. 1.*

Tip o' the Week #2, Jan. 7, 2011, The Electric Wand, p. 1-3.*

Outlook 2010: Using Resource Calendars, Apr. 25, 2011, http://web.archive.Org/web/20120425124538/http://support.anr.msu.edu/uploads/files/45/OutlookTrainingDocs/CalendarDocs/ANR_TS_Outlook_2010_Using_Resource_In-Outlook.pdf, ANR Technology Services Michigan State University, p. 1-16.*

Usman Javaid, A User Guide on Outlook, Apr. 15, 2010, addictivetips, p. 2.*

Add private notes or comments to Outlook meeting invite, Feb. 4, 2011, Spiceworks, p. 1.*

What is Outlook.com and how can 1 use it, Aug. 6, 2012, Business Productivity, p. 3.*

Outlook 2010 Basic Training, Aug. 20, 2011, NUIT http://www.it.northwestern.edu/collaborate/how-to/outlook2010-basic-training.html., p. 1-18.*

Change time-slot of multiple appointments at once, Mar. 31, 2012, Msoutlook.info, p. 1-2.*

Get a Room!, Nov. 7, 2011, technet.com, p. 2-4.*

Outlook 2010—Make an Appointment or Meeting Private, Apr. 14, 2011, ITServices Documentation, https://answers.uchicago.edu/page.php?id=18135, p. 1.*

Brian Burgess, Howto Assign tasks in Outlook 2010, May 8, 2012, gPost, p. 1-4.*

How to Delete All Calendar Events in Outlook 2010, Dec. 17, 2011, eHow, p. 1-3.*

Outlook—Wikipedia, Feb. 24, 2011, Wikipedia, p. 1-6.*

Outlook 2010 Time Zone Problems, Jul. 25, 2010, Microsoft Community, http://answers.microsoft.com/en-us/office/forum/office_2010-outlook/outlook-2010-time-zone-problems/9487e72d-f020-4bdd-bf46-3a52bf4c8e8b, p. 1.*

Microsoft Office 2010 Favorite New Features, Apr. 6, 2011, http://blog.pluralsight.com/microsoft-office-2010-features, Pluralsight blog, p. 1-8.—hereby after known as Favorite.*

BenHassine et al., "An agent-based approach to solve dynamic meeting scheduling problems with preferences", Engineering Applications of Artificial Intelligence, Pineridge Press, Swansea, GB, vol. 20, No. 6, Jun. 25, 2007, pp. 857-873. XPO22127278 ISSN: 09.

Dynamic Meeting Scheduler, ip.com Journal, ip.com Inc., West Henrietta, NY, US, Jun. 2, 2010, XPo13138470, ISSN: 1533-0001. 2 pages.

Moldover et al., "Composite Calendar View (Meeting Schedule Aid)", ip.com Journal, ip.com Inc., West Henrietta, NY, US, Jul. 1, 1987, XPO13029484, ISSN: 1533-0001. 4 pages.

Yves Demazeau et al., "A Decentralized Calendar System Featuring Sharing, Trusting and Negotiating", Jan. 1, 2006, Advances in

(56) References Cited

OTHER PUBLICATIONS

Applied Artificial Intelligence Lecture Notes in Computer Science; Lecture Notes in Artificial Intelligence; LNCS, Springer, Ber. 10 pages.
Understanding Meeting Updated, Jun. 11, 2012—http://blogs.technet.com/b/outlooking/archive/2012/06/11/understanding-meting-updates.aspx. 6 pages.
Using Outlook's Autopick Next and Suggested Times, Oct. 23, 2011—http://slipstick.com/outlook/calendar/using-outlooks-autopick-next-and-suggested-times/. 2 pages.
Tip o' the Week #2, Jan. 7, 2011—http://blogs.technet/com/b/ewan/archive/2011/01/07/tip-o-the-week-2 travel-times-in-outlook.aspx. 1 page.
Microsoft Office 2010 Favorite New Features, Apr. 6, 2011—http://blog.plurasight.com/microsoft-office-2010-features.
Outlook 2010: Using Resource Calendars, Apr. 25, 2011—http://web.archive.org/web/20120425124538/http://support.anr.msu.edu/uploads/files/4/5/OutlookTrainingDocs/CalendarDocs/ANR_TS_Outlook_2010_Using_Resource_In-Outlook.pdf. 16 pages.
Usman Javaid, A User Guide on Outlook, Apr. 15, 2010—http://www.addictivetips.com/microsoft-office/a-user-guide-on-outlook-2010-contacts/. 12 pages.
Add private notes or comments to Outlook meeting invite, Feb. 4, 2011—https://community.spiceworks.com/topic/127264-add-private-notes-or-comments-to-outlook-meeting-invite. 1 page.
What is Outlook.com and how can I use it, Aug. 6, 2012—http://www.businessproductivy.com/wp-content/uploads/2012/08/What-is-Outlook.com-and-how-can-I-use-it.pdf. 6 pages.
Outlook 2010 Basic Training, Aug. 20, 2011—http://www.it.northwestern.edu/collaborate/how-to/look2010-basic-training.html. 20 pages.
Change time-slot of multiple appointments at once, Mar. 31, 2012—http://www.msoutlook.info/question/659. 3 pages.
Get a Room!, Nov. 7, 2011—http://blogs.technet.com/b/educloud/archive/2011/11/07/get-a-room-enable-room-finder-with-room-list-distribution-groups.aspx. 3 pages.
Outlook 2010—Make an Appointment or Meeting Private, Apr. 14, 2011—https://answers.uchicago.edu/page.php?id=18135. 1 page.
Brian Burgess, How to Assign Tasks in Outlook 2010, May 8, 2012—http://www.groovypost.com/howto/assign-tasks-outlook-2010. 7 pages.
How to Delete All Calendar Events in Outlook 2010, Dec. 17, 2011—https://web.archive/org/web/20111217193504/http://www.ehow.com/how_815320_delete_calendar-events-outlook-2010.html. 2 pages.
Outlook—Wikipedia, Feb. 24, 2011—https://web.archive.org/web/2011022415093/http://en.wikipedia.org/wiki/Microsoft_Outlook. 6 pages.
Outlook 2010 Time Zone Problems, Jul. 25, 2010—http://answers.microsoft.com/en-us/office/forum/office_2010-outlook/outlook-2010-time-zone-problems/9487e72d-f-020-4bdd-bf46-3a52bf4c8e8b?auth=1. 9 pages.
Office Action; Chinese Application No. CN201380052287.6; dated Feb. 20, 2017; 10 pages.
English translation of Chinese Office Action; Chinese Application No. CN201380052287.6; 9 pages.
Office Action, Russian Application No. RU2015108140/08 (013033); dated Dec. 27, 2016; 6 pages.
English translation of Russian Office Action; Russian Application No. RU2015108140/08 (013033); 4 pages.
English translation of Chinese Application No. CN102413231; Published Apr. 11, 2012; 9 pages.
English translation of Russian Application No. RU2435208; Published Nov. 27, 2011; 15 pages.

\* cited by examiner

| Status | Time |
|---|---|
| ⋮ | ⋮ |
| Free | 8:00 |
| Free | 8:15 |
| Occupied | 8:30 |
| Occupied | 8:45 |
| Free | 9:00 |
| Pending | 9:15 |
| Pending | 9:30 |
| Free | 9:45 |
| Occupied | 10:00 |
| Free | 10:45 |
| Free | 11:00 |
| Pending | 11:15 |
| ⋮ | ⋮ |

MEETINGS AND EVENTS COORDINATING SYSTEM AND METHOD

RELATED APPLICATIONS

This application is a continuation-in-part of U.S. application Ser. No. 14/010,897, filed Aug. 27, 2013; which application claims priority to Israel Application No. 221868, filed Sep. 10, 2012. Each of the above-identified related applications are incorporated by reference.

FIELD OF THE INVENTION

The present invention relates to the field of calendaring system. More particularly, the invention relates to a method and system for dynamic scheduling services by synchronizing calendars in a confidential and anonymous manner without the need of sharing calendars content with other users.

BACKGROUND OF THE INVENTION

In today's world, the social networks are very developed and appreciated, but, somehow the basic function of meeting was left behind. With all today's technology we find it so hard to set an event/meeting/date/appointment, not mentioning group meetings of multi-participants events (such as parties, weddings, birthdays, religious ceremonies and the like).

How many times a day did you found yourself with wasted time and frustrated out of trying to synchronize your schedule with your work Co-workers/clients/friends/partner/children etc.? Canceled meetings which create empty windows on your schedule and delaying your home arrival time? The attempts of trying to find the convenient time and location when scheduling multi-participants events can be very frustrated and a time consuming task, especially when the participants handle their online calendars through different platforms and domains How important is the ability to have a dynamic scheduling service which will schedule and reschedule events according to their priority and will consider each of the participants' whereabouts even estimated time to arrive to the event's location? How many businessmen do not have personal assistant/secretary services, and even if they do have that privileged what happens when they are at home disconnected with their tomorrow's schedule and from their personal assistant's services? Why should an individual use several tools and calendars to define his business activities from his personal/private, non-Business activities—instead of receiving one scheduling services through all the aspects of his life that will have the ability to learn patterns and preferences from previous decisions as part of the decision process? How many times have you been needed a potential venue list for your events/tasks/meetings? Wishing to have a virtual Personal Assistant that will be available 24/7, with abilities to use predictive analysis and artificial Intelligence abilities to manage, optimize, schedule and reschedule your calendar automatically for you according to your preferences, lifestyle, life dynamics and whereabouts? How many times a day one heard or used the sentence "When can we meet?" With all recent technology, why shouldn't we enjoy artificial intelligence solution for scheduling services performing as closes to a human secretarial service? Wishing to have scheduling services that will be smart enough and will know you enough so that all you need to do is to define with whom you wish to meet, and from that point the scheduling service will know how to automatically schedule the meeting on the continent time and location?

As more users are connected to the Internet and conduct their daily activities electronically, the time asset of each user can become much more efficient. Therefore, it is an object of the present invention to provide a scheduling system which is capable of intelligently saving and organizing user's most expensive asset—time, in a confidential and dynamic manner, without the need of sharing calendars with other users, nor to use the domain or the same online calendar platform, by requiring minimal involvement from the users' side due to abilities to use predictive analysis and Artificial Intelligence abilities as part of the decision process to match each user to his habits, preferences, whereabouts and time frames.

It is another object of the present invention to provide a cross-platform system which is capable of operating through the users' online calendar, through mail, text message, instant messaging servers, social networks, or integrated with other third side applications or technologies.

Other objects and advantages of the invention will become apparent as the description proceeds.

SUMMARY OF THE INVENTION

In one aspect, the present invention relates to a method for providing dynamic scheduling services without sharing calendars content, comprising the steps of: a) retrieving real time availability data and terms applied to calendar's time cubes for an invitation to an event with one or more invited users, wherein said terms include at least location information and a level of importance; b) simultaneously synchronizing between calendars of said one or more invited users in a meeting and event coordinating server, in order to find at least one combination of common available matching time cubes (matching options) while considering said terms including arrival time calculations, wherein the state of said common available matching time cubes are defined as either "free", or as a sequence of "occupied"/"pending" states having a lower level of importance than the event currently created; c) setting the state of the matched time cubes as occupied at the calendar of each invited user; and d) rescheduling an event that was previously associated with the sequence of "occupied"/"pending" states with the lower level of importance, so that already existing events are automatically subject to changes constantly and immediately.

The present invention relates to a method for coordinating between calendars in a confidential and dynamic manner without the need to share calendars between users or participants, comprising the steps of:
Creating a central calendar for a user and dividing said centralized calendar into timeframes that are classified as business and non-business and are considered by a scheduling engine for incoming events, wherein a user can configure unlimited amount of timeslots for each timeframe. Optionally, enabling a user to add an unlimited amount of "personal" timeframes to be used for outgoing events, wherein each personal timeframe is categorized as business or non-business.
dividing each centralized account calendar into time cubes such that each calendar is represented as a chronological sequence of uniform time scales;
defining each time cube on each specific centralized account calendar according to one of the following availability states: free, occupied/busy or pending and according to location and to a level of importance as given by a calendar's account owner to time cubes that are stated as occupied/pending by allowing users to set a level of importance to each scheduled event;

allowing a user to subscribe to the system's service and to set or allow permissions to the system's service to use its machine learning, artificial intelligence abilities in order to preform settings of each user profile settings using predictive analysis that sets rules such as time frames (for example Business or non-business), activity hours (for example when usually starts the day and his sleeping hours), working days and hours habits and on each time frame specific time slots habits (when usually preform internal meetings or external meetings, exercise/gym hours and habits) on which the system will learn from previous performance and decision making how to suggest or automatically schedule any new meeting/event request to match the time and venue to each user and participants composition to his and their preferences, habits and whereabouts and to optimize the calendar according to the user's preferences, habits, availability and estimated traveling time required through predictive analysis and machine learning;

allowing a user to send data representing an invitation to an event/request for a meeting to one or more contacts for approval, allowing the user to define the invitees of this event as required and optional. by offering one or more convenient time and venue by opening a secure "private room" in a meeting and event coordinating server (that can be with no limitation a could server) that is adapted for synchronizing between users' calendars (with unlimited relevance to be under the same domain or use the same online calendar server) in a confidential and anonymous manner without using any calendaring content except the availability status of each user, whether it free, occupied or pending, location and level of importance as given by a calendar's owner to time cubes that are stated as occupied or pending, and importing to said "private room" the schedule of each contact, each participants' profile limitations using the system's predictive analysis and machine learning abilities (or the users settings) to set rules of each participants regarding his timeframes (for example business or non-business), time slots (for example internal meetings, external meetings) and previous decisions from previous mutual meetings of this composition regarding the participants (for example usually when Martin meets with John their meetings includes Mike as well), the length of the meetings, the previous mutual meeting venues (for example when Martin, John and Mike meetup their 70% of their meetings are situated at Martin's office and 30% of the meetings took place at the Bellano Coffee shop on San Perdo Square), previous meetings' time frame (for example: all Martin's, John's and Mike's previous mutual meetings were scheduled on Business Time frames). All the information is being synchronized on the server's secured private room that was originally created specifically for the new meeting session requirement in a confidential manner, such that each scheduling of each contact includes data representing their availability states, location and level of importance as given by a calendar's owner (or defined by the service's machine learning abilities from previous decisions) to time cubes that are stated as occupied or pending, wherein all contacts including said user are defined as attendees of said event;

at said secured "private room", searching all imported schedules simultaneously to find at least one option of common available matching time cubes among all attendee that defined as "free" state, or sequence or other combinations of "free" state time cubes between all attendees, or sequence of "occupied/pending" state time cubes that were graded by the calendar owner with lower level of importance than the current event that can be rescheduled, and considering all terms as given by said attendees and the data of said event, including time differences between all attendees and approximated traveling time of each attendee, prioritizing meetings with higher level of importance in the context of setting time of the event; and setting the matched time cubes as occupied, either automatically or after being approved by said attendees, including the proximate traveling time to the meeting/event for each attendee.

According to an embodiment of the invention, each schedule of each contact includes data representing their availability states, the level of importance given by each of the attendees' to the specific event comparing to other events scheduled on their calendars, location of the event and location of other previous events scheduled on their calendar in the aspect of the proximate traveling time requires to each attendee to arrival the event from previous scheduled event's location, differences in time zones between the attendees and/or the meeting venue.

According to an embodiment of the present invention, the method further comprises allowing each user to set a level of importance to each event. Additionally, the method further comprises importing the level of importance given by the calendar's owner to time cubes that are stated as occupied. Moreover, the method further comprises allowing prioritizing events in the calendar according to their level of importance, whenever there is a time conflict between two or more events, by postponing the less important event and rescheduling it to other time.

According to an embodiment of the present invention, the matching considering time zone differences and the required travelling time for each attendee either from the previous event's location or according to location provided from location services or by the user will be considered when offering potential scheduling time for event. Furthermore, the present invention offers a dynamic of the service according to the dynamics of the end users' life. Users' who travel to a location with a different time zone than where normally lives, or user who travels frequently, the service of the current invention will be able to learn of the changes of the users' current as well future location based on several measurements such as events' locations (including future scheduled and planed events), devices' location detections sensors, and the ability to update the service with 'planning a trip' and defining the device as for the locations panned, dates and the availability during that trip (virtual meeting only such as phone calls, conference videos, or nonbusiness meetings only/business meetings only), the service will use that ability through the decision procedure of the scheduling engine when finding the matching time so that scheduled meetings will be according to the user's correct time zone at the time of the event and according to his whereabouts, and plans and availability to each type of event (business/nonbusiness/meetings/virtual meetings and more). Allows the user to set a custom time range and select a different time zone for this range. Any incoming and outgoing events will use the selected time zone for scheduling (timeframe matching).

According to an embodiment of the invention, the method further comprises providing means to clear the entire day or entire time range from meetings/events and optionally have them all rescheduled by the system.

According to an embodiment of the invention, the method further comprises providing an option for the user to add remark that occurs at a certain time, but does not affect the user's schedule.

According to an embodiment of the invention, the method further comprises providing an option to send task(s) to one or more contacts of the user, wherein the task can be added (either automatically or upon approval) to the calendar of said contact(s). For example, creating such a send task can be posted as a time based remark to the user's calendar. The method further comprises providing potential time/dates and venue to perform the task. The method further comprises providing the user with more than one option to handle his tasks, e.g., such as through his scheduled time for the task on his calendar, or via a task list on his inbox. These two exemplary options or any other way to handle the tasks can be simultaneously updating each other, either automatically or upon a user approval.

According to an embodiment of the invention, the method further comprises applying with one or more optional meeting time for the event, wherein the availability state of the optional time sequences will be displayed on the calendar of each user such that the optional time cubes will be marked on the calendar (the state of the optional time cube can be either free, pending or occupied with low level of importance) and will allow the user to choose one of the offered matching options, wherein in case there are two or more event that are scheduled at the same time period, the system will alert the user, and either by the user approval or automatically the system will reschedule the less important event.

The method may further provide an "earliest choice" button for allowing the user to easily select the earliest time sequence that matches all the information, terms and limitations of the event and its attendees, considering the proximate traveling time needed for each attendee to arrive to the location of the new event from previous scheduled event location or according to location information provided by the user or by location services of a user's mobile device, and by prioritizing events with higher level of importance as graded by the user to optimized finding earlier options available by rescheduling less important scheduled events as graded by the user. For example, the optional event's time may appear as marked on the user's calendar without exposing/sharing any information of the other attendee's schedule. The user will be able to choose one of the offered optional meeting time or press the "earliest choice" button to set the earliest option as the event's time.

According to an embodiment of the invention, the method further comprises offering the events' venue or a notification regarding potential benefits of businesses around the current or future location of the end user, thereby allowing to display on the calendar of each user a location based notification related to a third party entity. For example, the third party entity can be an advertiser or a commercial content provider. Context of current or future location of the end user by scheduled events on his calendar or by events the user announced willing to apply.

According to an embodiment of the invention, the method further comprises allowing a user to hide a meeting's data from the calendar, and the time of the event will appear as busy, and only by applying a password the meeting's data will be exposed.

According to an embodiment of the invention, the method further comprises allowing a user to send designed invitations to selected events, wherein said designed invitation may include visual and audible content such as images, video, sounds or any combination thereof. For example, a user may add background music to the designed invitation.

According to an embodiment of the present invention, the method further comprises providing scheduling optimization by processing data related to user's preferences, habits, availability and events locations as to enable optimal scheduling with minimal traveling time for the user. For example, such optimization process may allow scheduling two different meetings situated at the same distant location at the same day, instead of causing the user to travel this distance twice (due to less optimized solution and less cost effective when the user needs to travel to the distant location in two different days). Moreover, open vacancy on user's schedule can be avoided, by rescheduling events in order to provide optimized scheduling results.

In another aspect the invention relates to a system for coordinating between users' calendars, comprising: a) a meeting coordinating server adapted for synchronizing between users' calendars in a confidential and anonymous manner via a secure "private room" without using any calendaring content except the following properties: the availability state of each user, whether it free, occupied or pending, the level of importance given to the event by each of the attendees, event location, proximate time to arrive from previous scheduled event location, the duration of the event, differences in time zones between attendees and/or the event location; and b) a dedicated application adapted for running/executing on a user's terminal unit in order to communicate and synchronize with said meeting coordinating server.

According to an embodiment of the invention, the system further comprises an advertising server for allowing one or more third party entities to provide location based content with respect to the user's calendar and current/future scheduled location(s), wherein whenever such location based content exist a notification will be displayed on the user's calendar as an icon or other relevant symbol which only represents or indicates the sector or type of the content.

In another aspect the present invention relates to a non-transitory computer-readable medium comprising instructions which when executed by at least one processor causes the processor to perform the method of the present invention.

BRIEF DESCRIPTION OF THE DRAWINGS

In the drawings:

FIG. 2 schematically illustrates an exemplary representation in a ribbon-like form of a calendar divided into time cubes, according to an embodiment of the present invention;

DETAILED DESCRIPTION OF THE INVENTION

Figure 1:
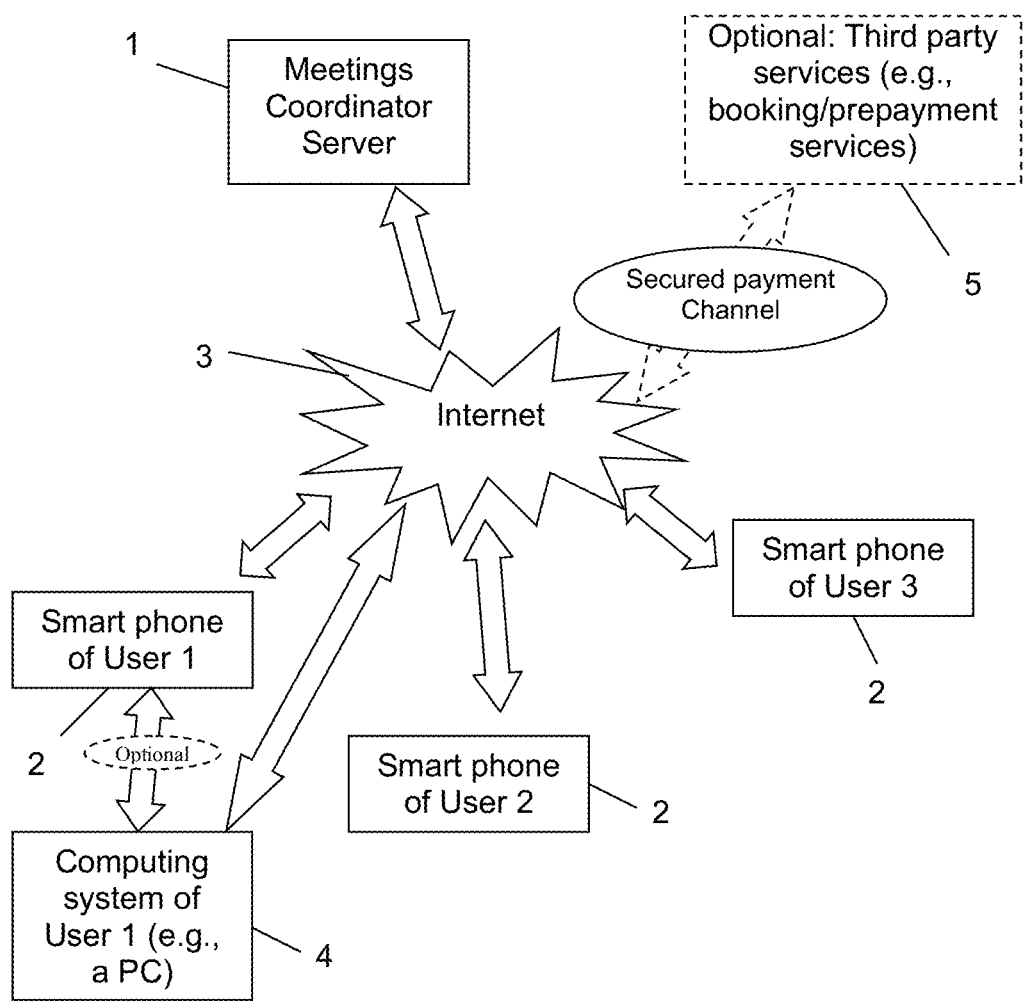
FIG. 1 schematically illustrates meetings coordinator system, according to an embodiment of the invention.

Embodiments of the present invention are directed to methods, systems and computer products for retrieving real time availability data (free/occupied/pending data) in a confidential and anonymous manner via an availability service for use by a requesting calendaring application's and/or a dedicated website for scheduling meetings and/or asset use with one or more meeting attendees and/or assets. Throughout this description the term "contacts" is used to indicate entities that are able to interact with the availability service of the present invention. For example, contacts may refer to a user's own contact list from his email account, mobile device, contacts added directly by the user to the availability service of the present invention, contacts list that may interact and sync with users' email accounts, mobile devices, third parties accounts (such as social networks accounts) and the service abilities to use machine learning and add contacts from previous event's invitations. The entities can be private users, third parties, reservation service providers, businesses, professional users, etc. For example, a private user may interact with other contacts whether they appear in his/her own contacts list or not.

The term "event" represents variety of actions or events that require allowancing time at the calendar of an end user, and sometimes may also require coordination with calendars of other end users. The present invention aims to provide an advanced, technology and method solution for finding the matching time for every action/event that requires scheduling and that involves the end users' time. In this context and without limitations, event may refer to a phone call, conference call, video conference, video call, meeting, conference, one person event, multi participant event, entire day event, task or any action or occurrence depending on time.

The present invention provides a scheduling service that enables a user to integrate with the service by adding at least one calendar account. In some embodiments, for each user the system creates an individual and a personal user account and a user profile that may include: first name and surname, at least one email address, daily activity hours, sleeping hours, working days and hours, used and frequently used address—optional, contact list (from email address, devices, third party services such as social networks, added to the service)—optional, records of prioritization (contacts, events, groups, locations, subjects).

A user may add/register/associate several email addresses and calendars from other services (e.g., private, work, etc.) and mobile devices (tablet, smartphone, etc.) to his user account in the system's services. Accordingly, the service creates a central account calendar for the user that may include all added/registered/associated account calendars, contacts, and information from the other services.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

FIG. 1 and the following discussion are intended to provide a brief, general description of a suitable computing environment in which the invention may be implemented. While the invention will be described in the general context of program modules that execute in conjunction with a dedicated application program that runs on a cloud server, mobile device (e.g., a smart phone) and can be companied by a dedicated website, integrated services (such as an application or feature integrated to third party services providers such as email services providers, devices operational systems, social network, instant messaging server, robot, etc.) those skilled in the art will recognize that the invention may also be implemented in combination with other program modules. Similarly, while certain examples may refer to a smart phone, other mobile devices or computer based electronic systems can be used as well, such as, without limitation, a tablet, a network-enabled personal digital assistant (PDA), a Personal Computer (PC) system and so on. Devices operational systems, email service providers, social networks, keyboards or features or applications on other third party service providers or platforms such as social networks, instant messaging servers, etc.

Unless otherwise indicated, the functions described herein may be performed by program modules that include executable code and instructions, which are stored in computer readable medium and running on one or more processor-based systems including cloud computing. However, state machines, and/or hardwired electronic circuits can also be utilized. Further, with respect to the example processes described herein, not all the process states need to be reached, nor do the states have to be performed in the illustrated order.

Generally, program modules include routines, programs, components, data structures, and other types of structures that perform particular tasks or implement particular abstract data types. Moreover, those skilled in the art will appreciate that the invention may be practiced with other computer system configurations, including cloud based services, handheld devices, multiprocessor systems, microprocessor-based or programmable consumer electronics, minicomputers, and the like. The invention may also be practiced in distributed computing environments where tasks are performed by remote processing devices that are linked through a communications network. In a distributed computing environment, program modules may be located in both local and remote memory storage devices and cloud computing.

In addition, while certain user inputs or gestures are described as being provided via phone key presses, data entry via a keyboard, or by clicking a computer mouse, or through email, text messages, instant messaging servers, or through integrated feature at third party provider, or devices Operation Systems, or hand/fingers movement on or above touch screens, optionally, user inputs can be provided using other techniques, such as by voice or otherwise. The example screen layouts, appearance, and terminology as depicted and described herein, are intended to be illustrative and exemplary, and in no way limit the scope of the invention as claimed.

With reference to FIG. 1, one exemplary system for implementing the invention includes a meeting coordinator server 1 and plurality of terminal units capable of communicating with meeting coordinator server 1. The terminal units can be any computer based device such as smart phones 2, a Personal Computer (PC) and the like. The communicating with server 1 can be done via a dedicated application or via a dedicated website (or web interface) or through email, text message, instant text message, devices' operational system's commend/request, third party request, API integration with third party service providers. In a basic configuration, the server 1 includes at least one processing unit and system memory (not shown) and it can be implemented as cloud server, virtual private server, dedicated server, or any other server configuration. The system memory includes one or more dedicated software applications and may include also program data for providing calendar management services by synchronizing between users' calendars in a confidential and anonymous manner. Optionally, the system may further incorporate with terminal unit(s) of third party services 5 to be discussed in greater details below. The server 1 and the terminal units communicate via a communication network 3, such as the Internet.

According to an embodiment of the invention, server 1 may include modules and services such as: Application Programming Interface (API) for communicating/integrating with third party applications under different operating systems, a text analysis module for parsing textual data related to event invitations (e.g., within email messages or instant messaging), a database, an event service module for scheduling events, a user service module, a web service module, and common services for managing a cloud platform. User and event related data can be processed as to provide optimal scheduling results.

According to an embodiment of the invention, each user of the system has its own private calendar that can be managed locally by the dedicated application either on a mobile device such as the smart-phone 2 or simultaneously and in synchronized manner via another computer system 4, such as a PC or a tablet or can be managed through an Application Programming Interface (API) of the service through a third party services or platforms, or can be operated by email, text message, instant messaging server, key board/feature on third party platforms/services. The server 1 and the dedicated application (e.g., via the user's terminal unit 2) can update each other periodically (e.g., every 15 minutes).

According to an embodiment of the invention, the dedicated application allows each user to set one or more terms in order to automatically manage the user's schedule, such as working hours, event's type (business/social etc.), daily activity hours, location (e.g. in order to take into account traveling time, for example, due to different city location and even different time zones between the attendees that are invited to the same event), reminders (e.g., to take a medicine, live sporting event, formal dress code, etc.), and the like. Once the event is scheduled, all the attendees will be defined as a meeting group of that specific event, which provides them with the ability to handle communication between all attendees with the reference of that specific event (e.g., massages, sharing file/image, voice massage, conference call, send tasks, etc.). Therefore, the system does not require sharing calendars content among contacts or group members in order to schedule events or activities.

Auto-Scheduling

If an event is sent by the organizer for both (or each) types of timeframes (business & non-business) service attempts to find a timeslot for an invitee's default timeframe. All considered dates for auto-scheduling will be from next midnight except for Manual Meeting events. Service will prefer event instances where the average Estimated Time of Arrival (ETA) for all required participants is the shortest within the earliest found week. When service identifies a date instance in a participant's calendar, it calculates the new event's ETA based on the previous event's location (when location is selected from GPS on line services such as Google Maps location). When the service identifies a date instance in a participant's calendar, it recalculates the next event's ETA according to the new event's location (when location is selected from GPS/traffic on line services such as Google Maps location). If the event is not a virtual meeting and no location was selected in GPS/141689.00101/102314064v.1 traffic on line services such as Google Maps for this event or the previous one, default ETA is 30 minutes.

Timeslots can be located in the following manner:
The service starts looking from tomorrow until Sunday and then 1 week forward Monday-Sunday. If no matches found in this week, it moves on to the next one.
The service narrows each participant's timeslots according to their timeframes and the event's category (business/non-business)
The service then locates all the available timeslots in the same week that have available duration as described in the event.
The service then calculates for each participant's timeslot if there is enough ETA before and after each event.
Finally the service superimposes all participants' found timeslots to find the earliest available one which is common to all. Preference is given to the earliest timeslot where at least one of the participants has an existing adjacent event in the same city.

If the scheduling engine cannot find an available timeslot for all required members, e.g., in the next 30 days, an indication to the event organizer can be created and displayed with a notification containing the nearest available date and a suggestion to edit the relevant event parameters (Duration, Timeframe, Participants). If no required participants approve the meeting, e.g., 24 hours after it was scheduled, the organizer can also be notified.

According to an embodiment of the present invention, the dedicated application allows the user to set the level of importance for each scheduled event (i.e., occupied time period in the user's calendar). For example, there can be at least two level of importance, such as "not important" and "very important". Therefore, in case there are two or more event that are scheduled at the same time period, the system will alert the user, and either by the user approval or automatically the system will reschedule the less important event.

Figure 3:
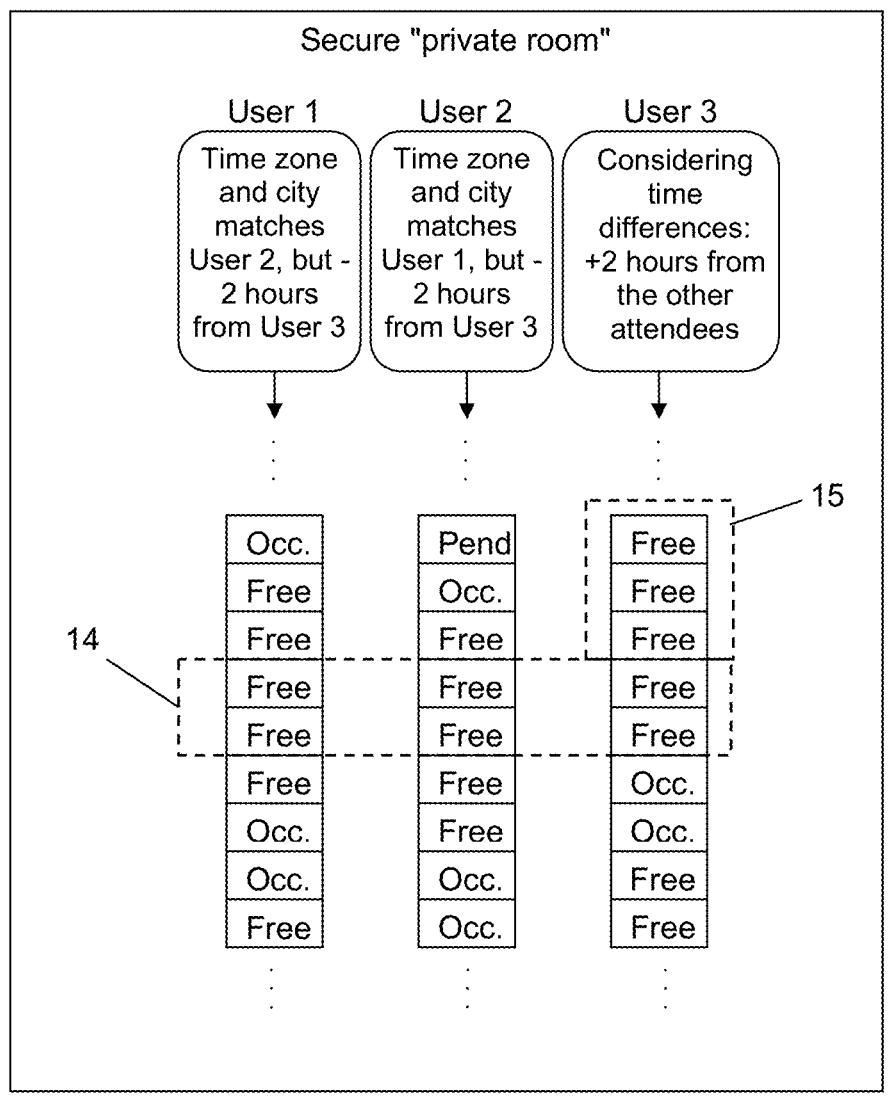
FIG. 3 schematically illustrates the matching between available time cubes of several attendees considering time differences and proximate traveling time to the location.
Figure 4:
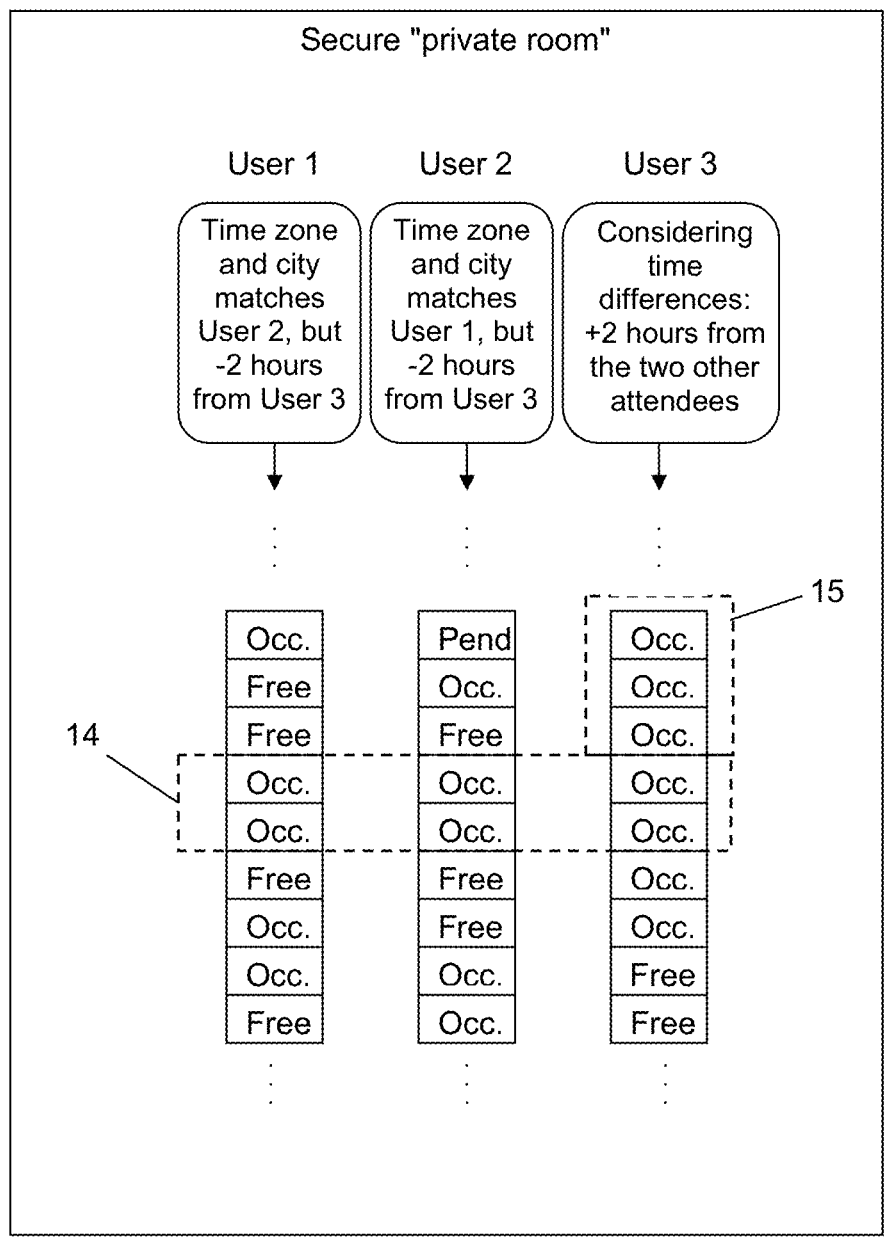
FIG. 4 schematically illustrates the registration of the meeting's/event's time and the traveling time as occupied on each of the attendee's calendar.

According to an embodiment of the invention, the meetings coordinating process within the server 1 may involve the following steps:
dividing each calendar into a plurality of time cubes (e.g., each time cube may represent a time period of 15 minutes) thereby providing calendars in form of a chronological sequence of uniform time scales (e.g., similar to a running ribbon as indicated by numeral 10 in FIG. 2);
allowing to define each time cube according to one of the following statuses: free (i.e., available, as indicated by numeral 11 in FIG. 2, e.g., can be represented by a green color), occupied (i.e., busy, as indicated by numeral 12 in FIG. 2, e.g., can be represented by a red color) or pending (as indicated by numeral 13 in FIG. 2, e.g., can be represented by a yellow color). For example, by default all time cubes can be set as "free", unless otherwise defined;
When a request to schedule an event for the user himself or with one or more users/contacts, opening a secure "private room" that will be used only by the system's mechanism (and it will be not shared with any user not even with the event's attendees). The system will import to this secure "private room" the schedule of each approved user (i.e., attendee) while the information on each imported schedule will be the status of each time cube (e.g., as represented by the relevant color: green, red or yellow and as shown with respect to FIG. 3 and FIG. 4) Optionally, it will also import the level of importance given by each attendee to time cubes that are defied as occupied, the event's duration, the event's type if given (e.g., business/social etc.), the event's venue, previous scheduled event's location to estimate proximate arrival time of each attendee to the event's location;

Then at this secured "private room", running and searching all schedules simultaneously (considering time zone differences, if relevant) to find the first or other options of available and common time cubes (or sequence or other combinations of common "free" time cubes) between all attendees and considering all terms given by attendees and the invitation/event data (e.g., the terms can be time and time differences, location, estimated traveling time of each attendee from previous event's location (e.g., in case of different time zone for different attendees, a location that requires travelling time with respect to a current location or location of a previous meeting, etc.). For example, the first available sequence of "free" time cubes for all attendees is indicated by the time cubes within the dotted line 14 in FIG. 3 with respect to the exemplary ribbon like form of the relevant calendar portion of three attendees (as indicated by the attendees: User 1, User 2 and User 3). For example, in case the travelling time of User 3 to the scheduled event with User 1 and User 2 may take several hours (e.g., due to the distance between the previous event's location of user 3 and the location of the new schedule event. In this case, while the system synchronizes the time sequence of common "free", "occupied" or "pending" time cubes between all attendees, to find matching available time or matching "occupied"/"pending" time cubes that have been prioritized as less important than the new issued event, the system takes into consideration the proximate traveling time needed for each attendee to arrive at the location of the new schedule event, and the estimated traveling time to arrive to the event's location by each of the attendees (including traffic information). The location information can be obtained as one of the scheduling terms either from previous event of each attendee calendar (if such event was scheduled) or based on location information provided by the user or by location services provided by the user's mobile device, e.g., GPS, cellular, third party services and the like (e.g., as indicated by the three "free" time cubes within the dotted line 15 in FIG. 3). The three "free" time cubes within dotted line 15 represent the proximate traveling time of the attendee (e.g., User 3) to the meeting's location from his previous event's location. and Setting the matching time cubes as occupied (as indicated by the time cubes within the dotted line 14 in FIG. 4), either automatically or after being approved by all the relevant attendees, including setting the time period of the travelling time in the calendar of User 3 as occupied (as indicated by the time cubes within the dotted line 15 in FIG. 4), in case the event's time was scheduled on "occupied"/"pending" time cubes graded by the calendar owner as a lower level of importance, the system will reschedule the less important event, either automatically or after being approved by calendar owner.

An additional advantage provided by the invention is the ability of calculating arrival time between following meetings. This is an essential capability that directly influence on the efficiency and dynamic behavior of the system. This capability allows the system to avoid situations when the distance and arrival time required between two following meetings may critically affect the entire schedule of a specific day or other time range. With this information the system will be able to reserve a matching arrival time, or to find the date and location for the meetings that would be more appropriate. Consideration of such information, the system of the present invention becomes equipped with innovative and advanced technology capabilities.

According to some embodiments of the invention, the system further comprises software means for providing one or more optional meeting time for an event, wherein the optional time sequences will be displayed on the calendar of each user such that the optional time cubes will be marked on the calendar and will allow the user to choose one of the offered matching options each of the attendees end user will not be exposed to the other end users attendees' calendared data, the procedure of finding the potential time sequences will be handled in a confidential manner and will not be exposed to the end users attendees to protect the privacy of each of the end users attendees. Optionally, the system may further comprise software means for providing an "earliest choice" button for allowing the user to easily select the earliest time sequence that match all the information, terms and limitations of the event and it's attendees.

As will be appreciated by the skilled person the meetings coordinating process described hereinabove results in a dynamic availability services for synchronizing calendars in a confidential and anonymous manner. The synchronization is made through secured private room, not allowing anyone (not even the calendar's owners—end users) to see the schedule of the other(s) attendee(s).

The suggested system can be used as a smart secretary that provides secretarial and personal management services to the user. As will be appreciated by the skilled person, the system is able to automatically manage the user's schedule based on the user's working hours and habits, and according to locations and priorities and grads given by the user to his scheduled events and contacts.

According to some embodiments of the present invention, the system further comprises additional features and services. The more information and data the user will share and set with the system the better secretarial and personal management services he will gain, never the less the system will provide defaults settings when missed set by the user. The system may offer event's venue according to users' requests and even can provide additional information and on-line reservations from a third party entity such as flights, hotel, car rental, restaurant reservation service or any other booking and prepayment services if needed, e.g., as shown by the third party services 5 in FIG. 1. For example, this can be obtained by using and cooperating with local/global matching search engines and PayPal/credit cards payment service via a secure payment channel.

All the above will be better understood through the following illustrative and non-limitative examples.

Figure 8:
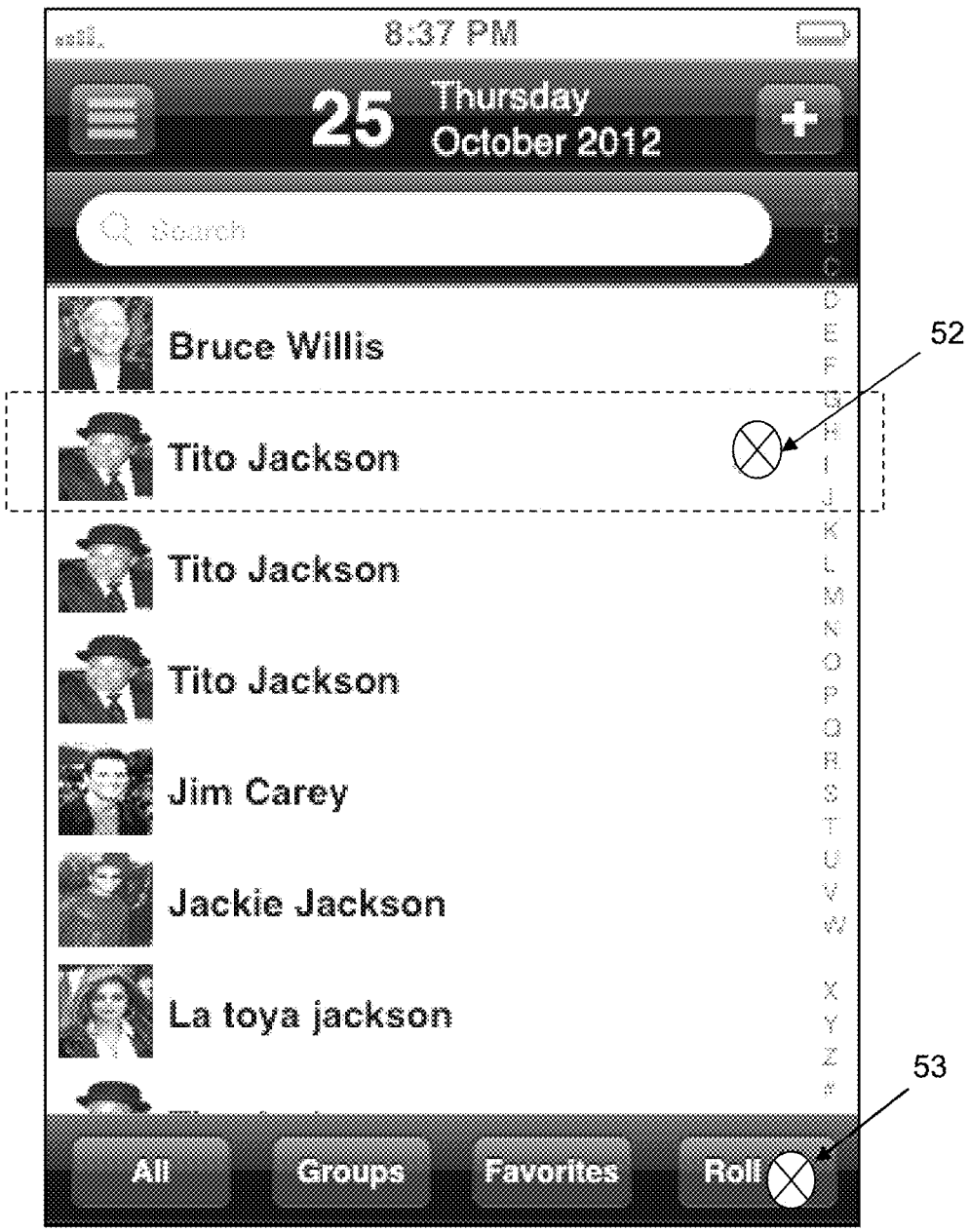

According to an embodiment of the invention, the system allows a user to define selected contacts as special role contacts, and optionally also to mark them in a unique visual manner with respect to the other contacts in the list (as indicated by numerals 52 and 53 in FIG. 8). In general, the special role contact may represent people that have specific task with respect to someone's private or professional life, such as a babysitter, a driver, a language translator, a dog walker, etc. This enables the user to set a specific role for the contact to be used when setting an event. For example, a user can define a specific contact with a special role such as a babysitter. Accordingly, whenever the user wishes to go to a specific event (e.g., a concert), the user can use the dedicated application to sync, in a confidential manner, with the babysitter's schedule (or alternatively with babysitting services) to order babysitting services in accordance with the desired event (e.g., the concert). This information is not shared with other contacts, and therefore the user can choose to update the role contact with the knowledge that he was chosen to have a special role in the users' life.

According to some embodiments of the invention, in some events, the user can use the dedicated application to send the relevant meeting/event's attendees special information/request/question regarding the event (e.g., dressing code, "bring a cake" or "would you be needed a vegetarian dish?", and the like). Once the event is scheduled, all the attendees will be defined as a meeting group of that specific event. This provides them with the ability to handle communication between all attendees with the reference of that specific event (e.g., massages, sharing file/image, voice massage, conference call, video conference, video massage send tasks etc.).

According to an embodiment of the invention, the system allows the user to set limitations to a contact, such as meet intervals (e.g., meeting every two weeks), enable/disable different properties, etc. Those limitations will be taken under consideration when using the auto mechanism to set up meetings. For example, such enable/disable properties may include:

Allow send task—will allow the specific contact to send a task to the user's calendar;

Contact priority—this is a way to know in case there are two meetings at the same time, which to accept, which to reschedule;

Privacy—will allow to hide data of all events and activities with that contact, in this scenario the time cubes of such scheduled events with that contact will be marked as occupied with no further data of the activity, and only by applying with correct pass code will the data be exposed; and Meeting gap—this is a roll to set in case the user wants to meet a person in gaps and not every time he wants to.

According to an embodiment of the present invention, the system enables to integrate the scheduling service to an email application or text messaging application correspondence and request the service to schedule a meeting between all the email/text messaging correspondence subscribers. Such cross-platform capabilities enable the user utlize the benefits of the service of the present invention, all without needing to leave the email application/text messaging application.

According to the embodiment of the present invention, a user can operate the service through a keyboard or integrated application on third party applications services and/or platforms.

Clear My Day/Time Range (CMD/CTR)

According to an embodiment of the present invention, the user can use the dedicated application to clear the entire day or Time Range from meetings/events and have them all reschedule by the system automatically (e.g., in case of emergency).

Clear my day/time range will function as an emergency button, to provide immediate assistance by clearing the entire day from meetings and tasks and will inform all the scheduled meeting's attendees (and tasks senders) about the need to cancel or reschedule the events of that day. The system will apply the user to choose between a default of a general message or a freehanded personal message he can apply.

Clear my day/time range option allows the user to clear the entire day from scheduled events/tasks/meetings. Preferably, all the users that are participants in meetings during that day will be notified canceling the events by a message. For example, clear my day may load an alert with 3 options:

Clear my day/time range and reschedule—using the auto mechanism of the system to reschedule all events/meetings/tasks and send messages to all relevant participants.

Clear my Day/time range—will send a message of cancelation to all participants.

Cancel—close the alert and do nothing.

"Clear My Time" Flow

Providing a time range to clear as selected by the user;

Excluding the cleared time range from scheduling, and optionally visually indicating the cleared time range with a Manual Meeting titled "Cleared" and/or other optional description provided by the user.

The events cleared from this time range will enter a rescheduling flow will be declined with an optional decline message.

Incoming manual meeting invitations will go directly to the collisions view.

Manual Meetings created by the organizer will appear in a collision view.

The dedicated application may send reminders for the user's events/meetings with all remarks mentioned to the reference.

An additional advantage provided by the invention is that the dedicated application in accordance with meeting coordinator server help the user to organize multi participants events, schedule with all attendees, giving the user number of precipitance how approved and scheduled your event in their calendar; and to handle all their communication regarding that event through the meeting group of the event For example, the user can use the dedicated application to receive main dish preference etc.

Figure 7A:
Figure 7B:

According to an embodiment of the invention, through the dedicated application a user could choose to send designed invitations (e.g., interactive, multimedia, 3D designed invitations, personalized background cover, etc.) to selected events and even to add music (e.g. ringtone/songs/video clip/remix music/play list, etc.) as background music to the invitation. FIGS. 7A and 7B schematically illustrate exemplary screen layouts of such an invitation. In this example, the invitation includes a textured/designed background (e.g., an image file type such as JPG, GIF or any other suitable image/video file type), text, schedule and operation button(s) for the invited user such as "accept"/"deny" and the option to view the event's time sequence on the user's schedule before accepting or denying the invitation. Once the invited user accepts the invitation, the system will set the invitation and the scheduling to the user's calendar and, optionally, those operation buttons will be removed from the invitation. FIG. 7A shows an example of the invitation creation screen where the user may select the preferred background, fonts, etc. FIG. 7B shows the invitation as received by an invited contact of that user.

According to an embodiment of the invention, through the dedicated application a user could choose to hide a meeting's data from the calendar, and the time of the event will appear as busy, but only by applying a password the meeting's data will be exposed.

According to some embodiments of the invention, the system allows the user to choose a specific background color to each contact person or a group of contacts (e.g., different color for each private group). This color can be used as the background color of all the events related to that contact person/group on the user's calendar.

The dedicated application will help the user to follow open invitation he had sent preapproved, incoming invitations he had received, update or cancel meetings/events. Moreover, through the dedicated application the user will be able to organize or join a group (e.g., for walking the dog shifts, purchases, school shuttle, book reading, etc.), but with the user's contacts or with other system's users having relevant attributes, e.g., such as users who live in the same city or have other common attributes.

Groups

According to an embodiment of the invention, there are at least two types of main groups: i) private groups that the user creates like family, friends, colleagues; and ii) meeting groups that are created automatically when a meeting or event is set. The system mechanism does not require the need of sharing calendars between contacts or group members in order to schedule events.

Figure 5:
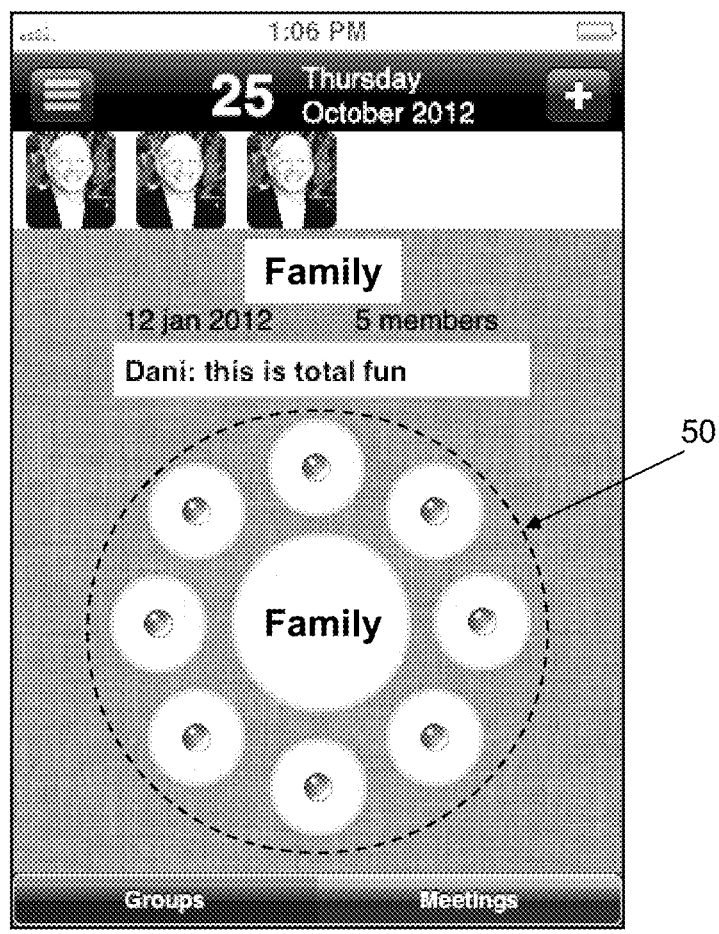
FIGS. 5-10 schematically illustrate screen layouts examples of the meeting coordinator system, according to some embodiments of the present invention.

FIG. 5 schematically illustrates an exemplary screen layout of private groups, according to an embodiment of the present invention. In the center screen layout there is a dialer 50 that enables the user to navigate between all groups. In this embodiment, turning the dialer 50 left or right enables to navigate between the different groups. For example, tapping on the center of the dial will provide information regarding the currently selected group screen such as the created date of the group, the number of contacts in this group, the last post sent in this group, etc.

Figure 6:
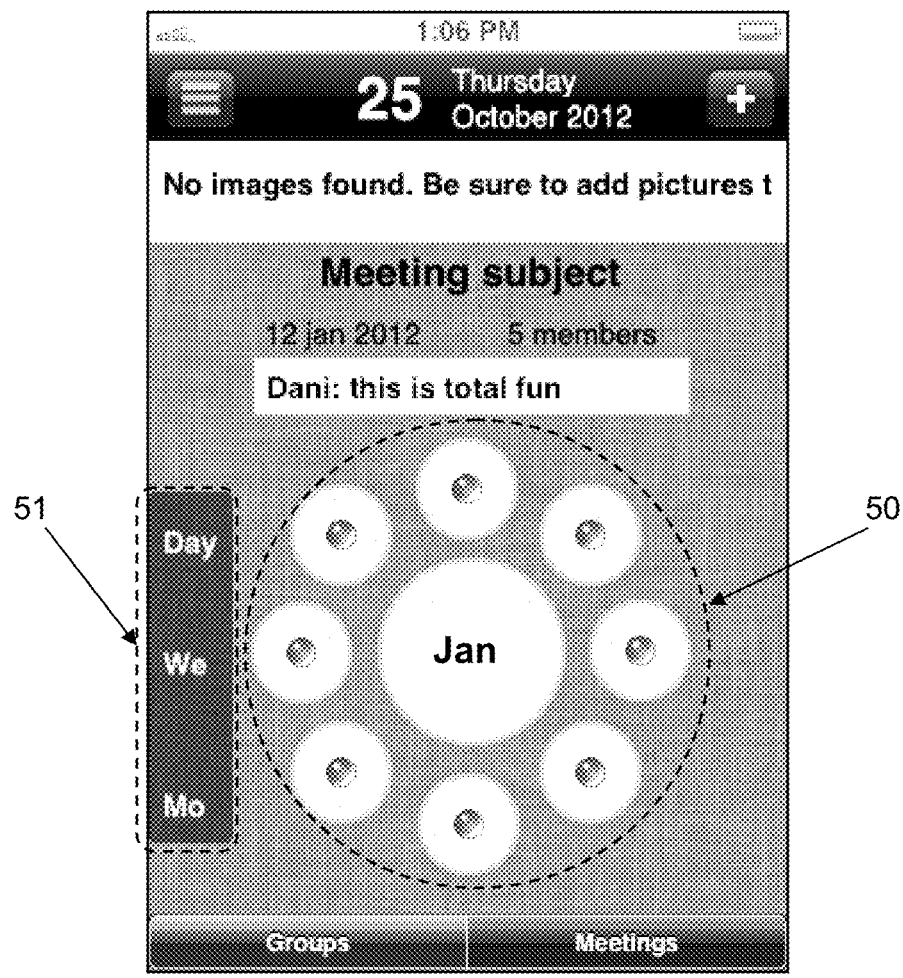

FIG. 6 schematically illustrates an exemplary screen layout of meeting groups, according to an embodiment of the present invention. The meeting groups are created automatically when a meeting is set. In this embodiment, the navigation between these groups is done in a dialer 50 like form, but with a schedule range selection 51 where the user can select the desired date range, such as day, week, month, etc.

Time Based Remark (TBR)

TBR is an option for the user to write down something that occurs at a certain time, but does not affect his scheduled. For example: Mom went to a vacation. According to an embodiment of the invention, the TBRs will appear in the calendar but will show that time as available and will be taken under consideration as available when using the auto meeting set up mechanism.

Send Task

According to some embodiments of the invention, the system comprises an option to send assignment(s) to one or more contacts of the user. The task can be added (either automatically or upon approval) to the calendar of that contact. Creating such a send task can be posted as a TBR to the user's own calendar. The method further comprises providing the user with two or more options to handle his tasks, e.g., through his scheduled time for the task on his calendar or via the task list on his inbox. Both options will simultaneously update each other.

Figure 9:
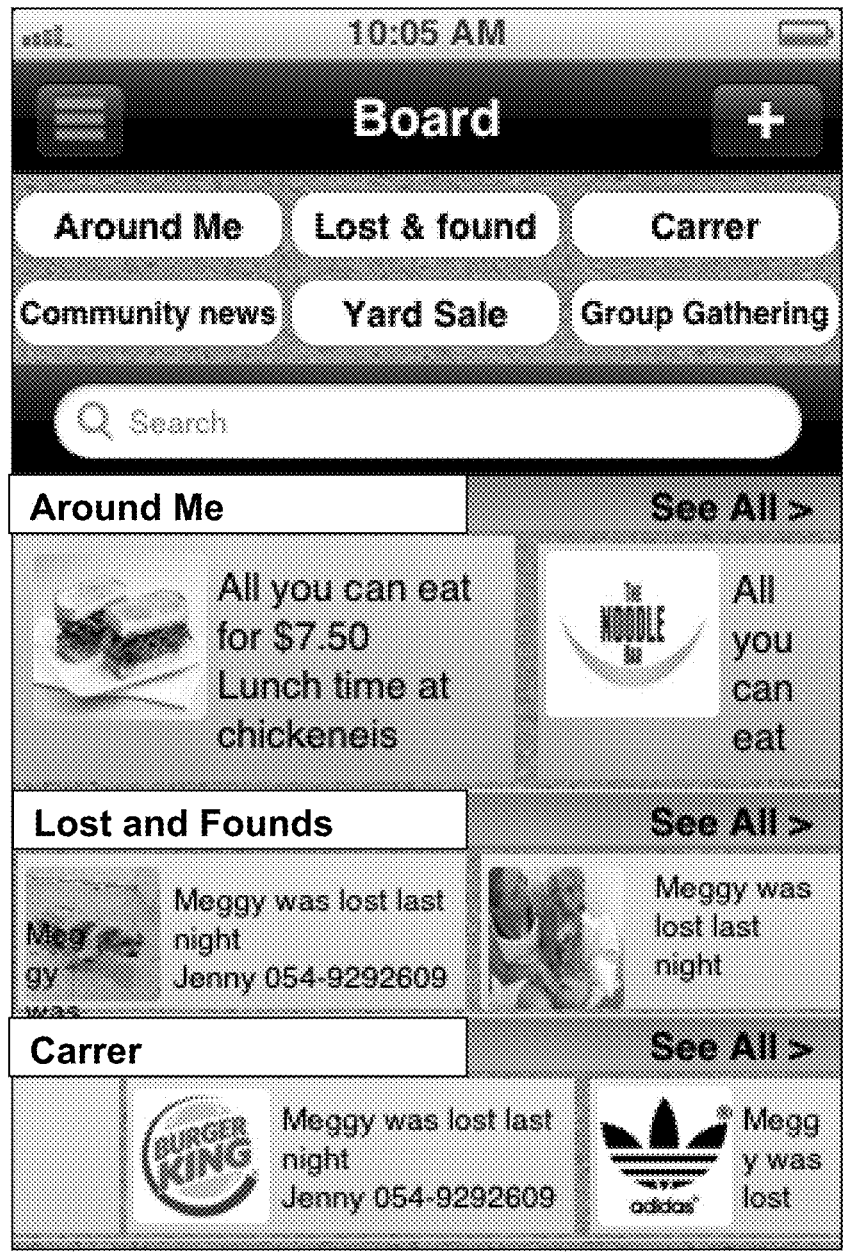

According to an embodiment of the invention, the system comprises a virtual billboard. The virtual billboard may include several categories/topics, such as places, attractions and business nearby, career opportunities, lost and found, community news, yard sale, group gathering and the like as schematically illustrated in FIG. 9. The billboard content can be either location based information (e.g., by GPS or according to scheduled meeting's locations) or non-location based information. For example, through the dedicated application each category may showcase top/selected messages (e.g., 3-5 messages on each category on each screen). Optionally, the messages can be scrolled sideways to provide unlimited ads. In selected mobile devices, there will be an option to tap and see all in order to view all messages in the specific board. Tap on a message will enlarge the message to full screen view.

Location Based Advertisement

According to an embodiment of the invention, the system comprises a location based content module (e.g., an advertising server), or alternatively, means to communicate with a third party commercial content server, for allowing one or more third party entities to provide location based content with respect to the user's calendar and its current/future scheduled location(s). Using this service, end users will be able to choose a venue for their events.

Figure 10:
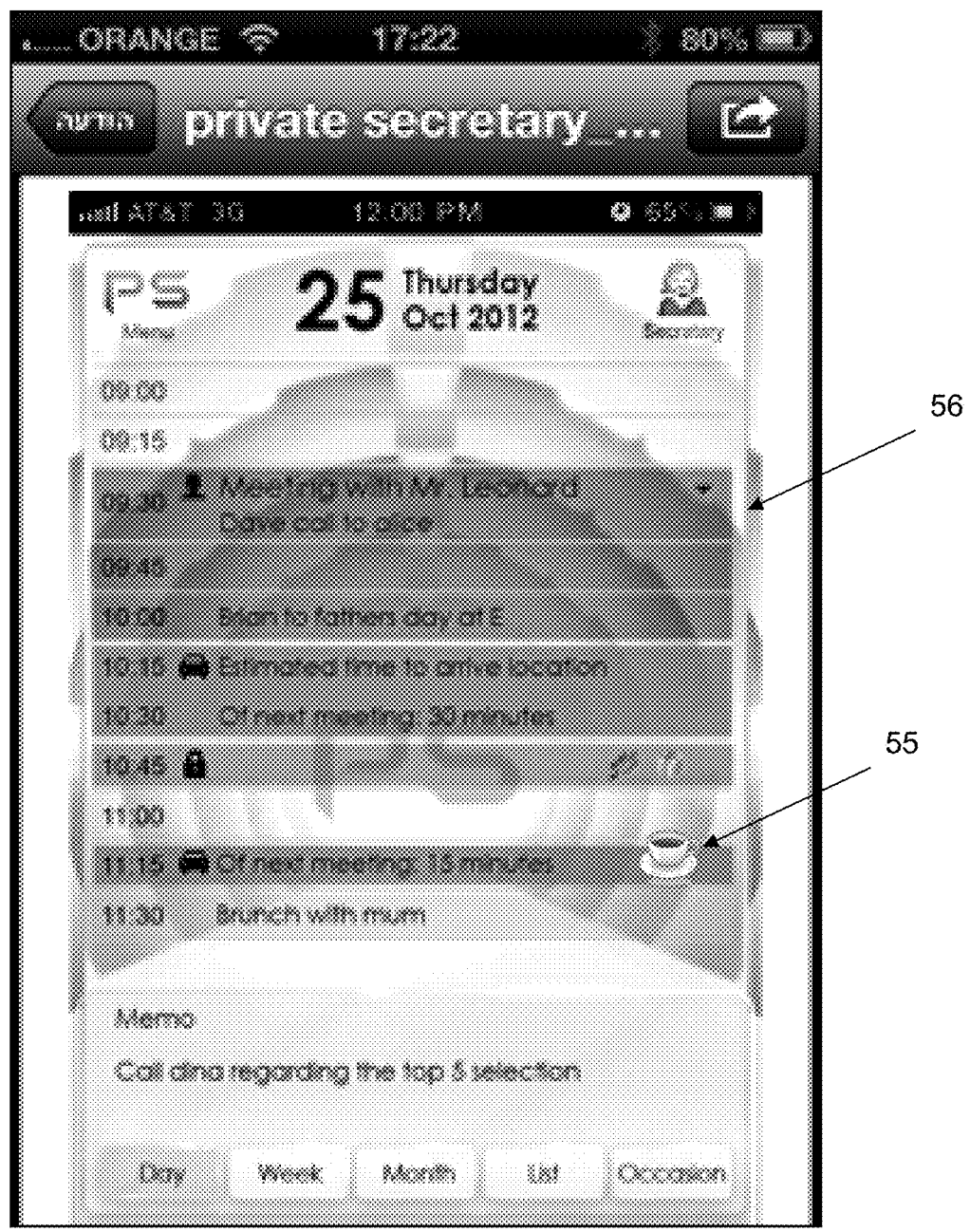

For example, whenever such location based content exist a notification will be displayed on the user's calendar as an icon or other relevant symbol which indicates or represents only the sector or type of the content, such as gastronomy sector (e.g., an icon in form of a cup of coffee that may indicate of a food related benefit such as a happy hour at a local pub or a discount at a specific restaurant), truism sector (e.g., an icon in form of the letter "i" that may represent a discount at a specific nearby hotel), culture and entertainment (e.g., an icon in form of a smiling face that may represent a discount for a sport event, a theater nearby, or movie), purchase culture (e.g., an icon in form of a shopping cart that may represent malls and shopping center nearby), transportation (e.g., an icon in form of a private car that may represent flight deals, available parking lot, car rent), etc. FIG. 10 schematically illustrates an icon 55 in form of a cup of coffee that represents the gastronomy sector as presented in the user's calendar 56.

According to an embodiment of the invention, the advertising are implemented in a manner and placements not just to avoid interference to the users working environment but even to bring the advertising to the users benefit as well to the advertiser. This is done through the concept that the system's application is an innovative way of connecting between users by considering them not only as private, social or professional individuals but all at once. Combined with the function of secretarial and private management services, the system provides with calendar management services. Through this ability, the system will offer a unique match between the advertiser to the users in the aspect of their device location detection and future event locations of the user, in a unique approach:

In this perspective, the system offers a new kind of advertisement which will, without any doubt, make the users curious and thus, increase their click probability on the ads. No more need to relate to usual terms from the advertising world such as impressions, clicks, conversions, CTR (click through rate: the relation between impressions and clicks). Showing the users geo-located thematic icons all along their way or future scheduled locations, without them to know what advertiser is hiding behind, will make stronger their will to discover what the icon is. And will create a curiosity by the user in the aspect of a "lottery ticket". For example, by clicking on these "icon" ads, a small and user friendly pop-up will open up and give the user the possibility to win and save a free gift/benefit, a coupon and the like at a nearby located business. This service offers a potential place for the events or potential location to perform their tasks via the calendar of each end user.

The user gains: a) a benefit with that relates to his current/future scheduled locations; and b) offered potential venue to his events, which answers one of the major factors and dilemmas when considering scheduling an event/task. The advertiser gains: a) a target audience per to the location near his business; b) creating curiosity through the ads that will increase the clicking frequencies and by that attract more users to view their ads; c) advertising at the suggested venue screen will be the closest advertising to "close deal". For example, if a user will choose to click on the business's ad as his meeting venue, that business will appear on the user's invitation and will be shown at all event's attendees' schedule.

The system of the present invention allows users to received/send an invitation with all meeting/event's data, and to easily and efficiently schedule and synchronized with the user's meetings attendees in a confidential and secured manner, without sharing one end user's calendar to another, knowing that anyone can't see the other's schedule. Moreover, a user can determine whether to accept the invitation, accept it but through day/dates/hour limitations (without letting other attendees knowing of such) or decline in a gentle way.

The system of the present invention provides a sort of an artificial intelligence, where a user's calendar is dynamic and adapts itself according to user-defined changes or events, so that the already existing calendar events are subject to change constantly and immediately automatically by the system.

The embodiments described hereinabove result, in a system that offers a service in which each end user will be able to coordinate events, tasks and appointments with contacts in a dynamic manner and without requiring them to disclose or share their schedule calendar information with other end users of the system or to be exposed to other end users schedule calendar information. Moreover, the system enables finding potential matching dates/time in a confidential and secure manner in a dynamic way, which is not exposed to any of the end users including the event's participants or even the event creator, We emphasize that the system will offer potential dates/time for events without exposing calendar schedule information between end users or participants, even free busy information is not being shared among the end users 1 event participants, and search results dates for a given event, fill be presented to each end user on his private calendar without exposing information (not even free/busy) of the other end users/event participants.

The system of the present invention considers the user with his entire aspects of his daily life, allowing the user to manage all the activities though an advanced and dynamic scheduling mechanism. The user can define the hours of his daily activities (on what time he starts his day and when he ends is daily activity), habits (e.g., like sports habits and the like), working days and hours, location, etc. It is very important on the schedule aspect to take into consideration traveling time between activities and events, when it comes to scheduling the traveling time between chronological following events can be crucial to the performance and the ability to carry out the events on time, or to the mechanism to define the matching date and time of the meetings.

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A method for automatically providing dynamic scheduling services without sharing calendar content, comprising the steps of:
   a. retrieving real time availability data and terms applied to calendar's time cubes for an invitation to a new event with one or more invited users, wherein said terms include data relative to location information and a level of importance;
   b. simultaneously synchronizing between calendars of said one or more invited users in a meeting and event coordinating server, where the simultaneously synchronizing comprises the steps of:
      1) searching for an available timeslot in a same week that has an available duration as defined in the new event;
      2) calculating, for each timeslot, if there is enough estimated time of arrival (ETA) before and after each scheduled event; and
      3) superimposing all user's found timeslots to find an earliest available one which is common to all;
   the simultaneous synchronizing being performed in order to find at least one combination of common available matching time cubes (matching options) while considering said terms including arrival time calculations, by identifying a date instance in the calendar of each invited user and calculating an estimated time of arrival (ETA) for the new event based on location of previous scheduled event, wherein the state of said common available matching time cubes are defined as either "free", or as a sequence of "occupied"/"pending" states having a lower level of importance than the event currently created, wherein, when finding more than one matching option for the event, providing the estimated time cubes needed to arrive to the event's location, and accordingly automatically selecting the earliest matching option or enabling the user to choose one of the matching options or allowing the user to easily select the earliest matching option by providing an "earliest choice" button;
   c. setting the state of the matched time cubes as occupied at the calendar of each invited user;
   d. recalculating the ETA of another event by obtaining data relative to the location of the new event and traffic conditions received from on-line sources; and
   e. rescheduling an event that was previously associated with the sequence of "occupied"/"pending" states with the lower level of importance, so that already existing events are automatically subject to changes constantly and immediately.

2. The method according to claim 1, further allowing prioritization of events in the calendar according to their level of importance and contacts priority, whenever there is a time conflict between two or more events, by postponing the less important event and rescheduling it to another time.

3. The method according to claim 1, further providing means to clear the entire day or time range from scheduled events and to automatically, or upon approval, reschedule one or more of said cleared events while considering the terms including the user's working hours, habits, locations and arrival time calculations and predictive analysis based on previous decisions and machine learning abilities.

4. The method according to claim 1, further allowing a setting of a custom time range and a selecting of a different time zone for this time range, so that any incoming and outgoing events will use the selected time zone for scheduling as a timeframe matching.

5. The method according to claim 1, further providing an ability to operate the service through third party providers, thereby enabling to schedule meeting through a third party application or service.

6. The method according to claim 1, further allowing a display on the calendar of each user a location based notification related to a third party entity and sending notifications when time to start traveling for upcoming events or changes in estimated traveling time due to changes in traffic occurs.

7. The method according to claim 6, wherein the third party entity is an advertiser or a commercial content provider.

8. The method according to claim 1, further offering event's venue according to a user's request.

9. The method according to claim 8, further providing additional information and on-line reservations from a third party.

10. The method according to claim 1, further allowing a defining of selected contacts as special role contacts, and optionally marking said special role contacts in a visual manner with respect to the other user's contacts in order to be used when setting an event.

11. The method according to claim 1, further allowing a user to hide a meeting's data from the calendar, and the time of the event will appear as busy, and only by applying a password will the meeting's data be exposed.

12. The method according to claim 1, further allowing a user to send designed invitations to selected events, wherein said designed invitations may include visual or audible information such as images, video or sounds, background music, or any combination thereof.

13. The method according to claim 1, further providing scheduling optimization by processing data related to a user's preferences, habits, availability and events locations, to enable optimal scheduling with minimal traveling time for the user.

14. The method according to claim 1, further comprising automatically, or upon approval, managing a user's schedule based on the user's working hours, habits, location information and priorities/grades given to scheduled events and contacts, thereby providing an artificial intelligence calendar where a user's calendar is dynamic and adapts itself according to user-defined changes or events, so that the already existing calendar events are subject to change constantly and immediately.

15. A system configured to automatically provide dynamic scheduling services and coordination between users' calendars without sharing calendar content, comprising:
  at least one processor; and
  a memory comprising computer-readable instructions which when executed by the at least one processor causes the processor to execute a meeting and events coordinating server adapted to synchronize between availability states of time cubes in users' calendars while considering terms including arrival time calculations and a level of importance of each scheduled event,
  wherein the server is adapted to:
  retrieve real time availability data and terms applied to calendar's time cubes for an invitation to a new event with one or more invited users, wherein said terms include at least data relative to location information and a level of importance;
  simultaneously synchronize between calendars of said one or more invited users in a meeting and event coordinating server, where, to simultaneously synchronize, the server is adapted to:
    search for an available timeslot in a same week that has an available duration as defined in a new event;
    calculate, for each timeslot, if there is enough estimated time of arrival (ETA) before and after each scheduled event; and
    superimpose all user's found timeslots to find an earliest available one which is common to all;
  in order to find at least one combination of common available matching time cubes (matching options) while considering said terms including arrival time calculations, by identifying a date instance in the calendar of each invited user and calculating an estimated time of arrival (ETA) for the new event based on location of previous scheduled event, wherein the state of said common available matching time cubes are defined as either "free", or as a sequence of "occupied"/"pending" states having a lower level of importance than the event currently created, wherein, when finding more than one matching option for the event, providing the estimated time cubes needed to arrive to the event's location, and accordingly automatically selecting the earliest matching option or enabling the user to choose one of the matching options or allowing the user to easily select the earliest matching option by providing an "earliest choice" button;
  set the state of the matched time cubes as occupied at the calendar of each invited user;
  recalculate the ETA of another event by obtaining data relative to the location of the new event and traffic conditions received from on-line sources; and
  reschedule an event that was previously associated with the sequence of "occupied"/"pending" states with the lower level of importance, so that already existing events are automatically subject to changes constantly and immediately.

16. The system according to claim 15, further comprising a dedicated application adapted to run/execute on a user's terminal device to communicate and synchronize events with said server.

17. The system according to claim 15, further comprising an advertising server adapted to allow one or more third party entities to provide location based content with respect to scheduled events in the user's calendar and current/future scheduled location(s), wherein, whenever such location based content exists displaying a notification on the user's calendar as an icon or a symbol which represents or indicates the sector or type of content.

18. A method for automatically providing dynamic scheduling services without sharing calendar content, comprising the steps of:
  a. retrieving real time availability data and terms applied to calendar's time cubes for an invitation to a new event with one or more invited users, wherein said terms include data relative to location information and a level of importance;
  b. simultaneously synchronizing between calendars of said one or more invited users in a meeting and event coordinating server, where simultaneously synchronizing includes at least superimposing all user's found timeslots to find an earliest available one which is common to all, the simultaneous synchronizing being performed in order to find at least one combination of common available matching time cubes (matching options) while considering said terms including arrival time calculations, by identifying a date instance in the calendar of each invited user and calculating an estimated time of arrival (ETA) for the new event based on location of previous scheduled event, wherein the state of said common available matching time cubes are defined as either "free", or as a sequence of "occupied"/"pending" states having a lower level of importance than the event currently created, wherein, when finding more than one matching option for the event, providing the estimated time cubes needed to arrive to the event's location, and accordingly perform one of the following, from a system configured to provide: automatic system selection of the earliest matching option; or user selection of one of the matching options; or easy user selection of the earliest matching option by provision of an "earliest choice" button;

c. setting the state of the matched time cubes as occupied at the calendar of each invited user;

d. recalculating the ETA of another event by obtaining data relative to the location of the new event and traffic conditions received from on-line sources; and e. rescheduling an event that was previously associated with the sequence of "occupied"/"pending" states with the lower level of importance, so that already existing events are automatically subject to changes constantly and immediately.

19. The method according to claim 18, where simultaneously synchronizing further comprises the steps of: searching for an available timeslot in a same week that has an available duration as defined in a new event; and calculating, for each timeslot, if there is enough ETA before and after each scheduled event.

20. A system configured to automatically provide dynamic scheduling services and coordination between users' calendars without sharing calendar content, comprising:

at least one processor; and a memory comprising computer-readable instructions which when executed by the at least one processor causes the processor to execute a meeting and events coordinating server adapted to synchronize between availability states of time cubes in users' calendars while considering terms including arrival time calculations and a level of importance of each scheduled event, wherein the server is adapted to:

retrieve real time availability data and terms applied to calendar's time cubes for an invitation to a new event with one or more invited users, wherein said terms include at least data relative to location information and a level of importance;

simultaneously synchronize between calendars of said one or more invited users in a meeting and event coordinating server, where, to simultaneously synchronize, the server is adapted to superimpose all user's found timeslots to find an earliest available one which is common to all, in order to find at least one combination of common available matching time cubes (matching options) while considering said terms including arrival time calculations, by identifying a date instance in the calendar of each invited user and calculating an estimated time of arrival (ETA) for the new event based on location of previous scheduled event, wherein the state of said common available matching time cubes are defined as either "free", or as a sequence of "occupied"/"pending" states having a lower level of importance than the event currently created, wherein, when finding more than one matching option for the event, providing the estimated time cubes needed to arrive to the event's location, and accordingly provide for performance of one of the following, where the server is configured for: automatic system selection of the earliest matching option; or user selection of one of the matching options; or easy user selection of the earliest matching option by provision of an "earliest choice" button;

set the state of the matched time cubes as occupied at the calendar of each invited user;

recalculate the ETA of another event by obtaining data relative to the location of the new event and traffic conditions received from on-line sources; and reschedule an event that was previously associated with the sequence of "occupied"/"pending" states with the lower level of importance, so that already existing events are automatically subject to changes constantly and immediately.

21. The system according to claim 20, wherein, to simultaneously synchronize, the server is further adapted to search for an available timeslot in a same week that has an available duration as defined in a new event; and calculate, for each timeslot, if there is enough ETA before and after each scheduled event.

\* \* \* \* \*